(12) United States Patent
Zheng et al.

(10) Patent No.: US 9,870,874 B2
(45) Date of Patent: Jan. 16, 2018

(54) ELECTROLYTE SOLUTE, ELECTROLYTE, AND HIGH-VOLTAGE SUPERCAPACITOR

(71) Applicant: SHENZHEN CAPCHEM TECHNOLOGY CO., LTD., Shenzhen (CN)

(72) Inventors: Zhongtian Zheng, Shenzhen (CN); Yingjie Cao, Shenzhen (CN); Chaowei Cao, Shenzhen (CN); Longliang Xue, Shenzhen (CN); Xiaoxia Xiang, Shenzhen (CN)

(73) Assignee: Shenzhen Capchem Technology Co., LTD., Shenzhen (CN)

(*) Notice: Subject to any disclaimer, the term of this patent is extended or adjusted under 35 U.S.C. 154(b) by 0 days.

(21) Appl. No.: 14/655,289

(22) PCT Filed: Jun. 26, 2014

(86) PCT No.: PCT/CN2014/080867
§ 371 (c)(1),
(2) Date: Jun. 24, 2015

(87) PCT Pub. No.: WO2015/196427
PCT Pub. Date: Dec. 30, 2015

(65) Prior Publication Data
US 2017/0110260 A1    Apr. 20, 2017

(51) Int. Cl.
*H01G 9/035* (2006.01)
*H01G 11/62* (2013.01)
*H01G 11/60* (2013.01)
*H01G 11/32* (2013.01)

(52) U.S. Cl.
CPC .......... *H01G 11/62* (2013.01); *H01G 11/32* (2013.01); *H01G 11/60* (2013.01)

(58) Field of Classification Search
CPC ......... H01G 11/62; H01G 11/32; H01G 11/60
See application file for complete search history.

(56) References Cited

U.S. PATENT DOCUMENTS

| | | | |
|---|---|---|---|
| 6,181,545 B1 * | 1/2001 | Amatucci | H01G 9/155 361/502 |
| 6,491,841 B1 * | 12/2002 | Maletin | H01G 9/038 252/62.2 |
| 7,834,197 B2 | 11/2010 | Nishida et al. | |
| 8,366,956 B2 | 2/2013 | Nishida et al. | |
| 8,747,690 B2 | 6/2014 | Nishida et al. | |
| 2013/0044860 A1 | 2/2013 | Nicholson et al. | |

FOREIGN PATENT DOCUMENTS

| | | |
|---|---|---|
| AT | 542259 | 2/2012 |
| AU | 2004254231 | 1/2005 |
| CA | 2530814 | 1/2005 |
| CN | 1802362 | 7/2006 |
| CN | 101165828 | 4/2008 |
| CN | 101587777 | 11/2009 |
| CN | 101593625 | 12/2009 |
| CN | 101901691 | 12/2010 |
| CN | 102093367 | 6/2011 |
| CN | 103021676 | 4/2013 |
| CN | 103730263 | 4/2014 |
| CN | 103956268 | 7/2014 |
| EP | 1642894 | 4/2006 |
| EP | 2172463 | 4/2010 |
| IN | 248439 | 7/2011 |
| JP | 2007039460 | 2/2007 |
| JP | 2007112811 | 5/2007 |
| JP | 3950464 | 8/2007 |
| JP | 2007306017 | 11/2007 |
| JP | 2010260867 | 11/2010 |
| KR | 20060026904 | 3/2006 |
| RU | 2006102854 | 7/2006 |
| TW | 200508177 | 3/2005 |
| WO | 2005003108 | 1/2005 |

OTHER PUBLICATIONS

Janes et al, "Characterization of Non-Aqueous Supercapacitors Based on Titanium Carbide Derived Carbon Eelectrodes and Novel Doubly Chraged Cation Based Salts", ECS Transactions, 33(27), 2011, pp. 47-54.*

* cited by examiner

*Primary Examiner* — C Melissa Koslow
(74) *Attorney, Agent, or Firm* — Dicke, Billig & Czaja, PLLC

(57) ABSTRACT

The present invention relates to the electrochemical field, particularly to an electrolyte solute and an electrolyte that are used for a high-voltage supercapacitor, and a high-voltage supercapacitor using the electrolyte. The anion of the electrolyte solute may be one or more selected from tetrafluoroborate, hexafluorophosphate, bis(trifluoromethylsulfonyl) imide, tris (trifluoromethylsulfonyl) methyl and perfluoroalkyl sulfonate, and the cation may be N-methyl-1,4-diazabicyclo[2.2.2]octane ammonium, N,N-dimethyl-1,4-diazabicyclo[2.2.2]octane ammonium, N-methyl-1-azabicyclo[2.2.2]octane ammonium. The high-voltage supercapacitor fabricated by using the electrolyte formulated by the electrolyte solute of the present invention can work stably for a long period of time at a voltage of 2.7 V to 3.2 V, the energy density is greatly increased, the property of high power density is maintained, and the working life is prolonged.

13 Claims, No Drawings

ELECTROLYTE SOLUTE, ELECTROLYTE, AND HIGH-VOLTAGE SUPERCAPACITOR

BACKGROUND

Technical Field

The present invention relates to the electrochemical field, particularly to an electrolyte solute and an electrolyte that are used for a high-voltage supercapacitor, and a high-voltage supercapacitor using the electrolyte.

Related Art

A supercapacitor, also referred to as gold capacitor or electrochemical capacitor, stores energy by means of ion adsorption (electric double layer capacitor) or a rapid surface redox reaction (pseudocapacitor). The supercapacitor is a novel energy storage device in between a cell and a conventional static capacitor. The number of charges stored by the supercapacitor is hundreds or thousands of times of that of a conventional electrolytic capacitor, and the supercapacitor can be completely charged or discharged within a few seconds, which has power input or output higher than that of a cell and can reach such power input or output in a shorter period of time. At the same time, the supercapacitor has the advantages of short charge and discharge time, long storage service life, high stability and wide operating temperature range (−40° C. to 70° C.), and has been widely applied in the field of consumer electronics products, the field of new energy generation systems, the field of distributed energy storage systems, the field of intelligent distributed grid systems, the transportation field such as new energy vehicles, the load field such as energy-saving elevators and cranes, the field of military equipment such as electromagnetic bombs, the motion control field, and the like, involving various sectors such as new energy generation, smart grid, new energy vehicles, energy-efficient buildings, industrial energy conservation and emissions reduction, and belongs to standard full range of low-carbon economy core products.

Compared with an electrochemical cell, the supercapacitor has a lower energy density and working voltage, and these disadvantages greatly limit the application of the supercapacitor in hybrid vehicles and electric vehicles. The energy storage formula of the supercapacitor is $E=CV^2/2$, and therefore, the energy density of the supercapacitor can be effectively improved by increasing the working voltage of the supercapacitor. However, when working at a voltage exceeding 2.7 V, an electrolyte of a currently commercialized supercapacitor may be electrochemically decomposed, resulting in a significant increase in the pressure within the capacitor, and a significant decrease in the electrochemical performance, and finally resulting in a failure of the capacitor.

The working voltage of the capacitor is determined by the decomposition voltage of the electrolyte, and therefore, the bottleneck of the supercapacitor can be effectively broken through by developing an electrolyte used by a high-voltage supercapacitor, especially by finding a high-withstand voltage solute, and moreover, a good balance between a high withstand voltage and a long service life of the supercapacitor can further be achieved. Chinese Patent Publication No. CN100536048C discloses an electrolyte of a supercapacitor containing a mixture of N,N-dihaloalkyl-1,4-cis-1,4-bicyclic octanediium tetrafluoroborate and conventional tetraethyl ammonium tetrafluoroborate ($Et_4NBF_4$). The electrolyte of the supercapacitor has a certain high pressure resistance, but the service life characteristic of the supercapacitor is not described. Chinese Patent Publication No. CN101809693A sets forth that various acid scavengers are added to a conventional $Et_4NBF_4$ acetonitrile (AN) solution to alleviate an increasing rate of pressure in a capacitor, so as to achieve the purpose of improving a working voltage of the supercapacitor. This method can have a certain effect in the early period of using the supercapacitor, but with the extension of the service life, the electrochemical performance of the capacitor is significantly degraded, and the service life characteristic of the capacitor needs to be significantly improved.

SUMMARY

In view of this, an objective of the present invention is to provide an electrolyte solute and an electrolyte that are used for a high-voltage supercapacitor, and a supercapacitor, so as to improve the energy density of the supercapacitor, and realizing the long-service life characteristic of the supercapacitor.

A technical solution used by the present invention is to provide an electrolyte solute, having a chemical structural formula of one or more of a structural formula 1, a structural formula 2, and a structural formula 3 below:

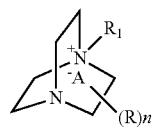

Structural formula 1

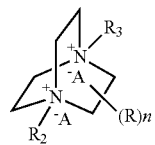

Structural formula 2

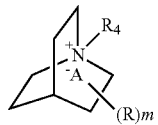

Structural formula 3 where R, $R_1$, $R_2$, $R_3$ and $R_4$ are respectively a hydrocarbyl group containing 1 to 5 carbon atoms (which may form cyclization in pairs), $^-A$ is an anion, n and m are the number of substituents on the ring, n is an integer of 0 to 6, and m is an integer of 0 to 7.

Furthermore, a cation of the electrolyte solute is one or more of:
N-methyl-1,4-diazabicyclo[2.2.2]octanediium,
N-ethyl-1,4-diazabicyclo[2.2.2]octanediium,
N,N-dimethyl-1,4-diazabicyclo[2.2.2]octanediium,
N-methyl-N-ethyl-1,4-diazabicyclo[2.2.2]octanediium,
N,N-diethyl-1,4-diazabicyclo[2.2.2]octanediium,
N-methyl-1-azabicyclo[2.2.2]octanediium, and N-ethyl-1-azabicyclo[2.2.2]octanediium.

Furthermore, the cation of the electrolyte solute is one or more of: N-methyl-1,4-diazabicyclo[2.2.2]octanediium, N,N-dimethyl-1,4-diazabicyclo[2.2.2]octanediium, and N-methyl-1-azabicyclo[2.2.2]octanediium.

Furthermore, the anion of the electrolyte solute is one or more of: tetrafluoroborate, hexafluorophosphate, bis(fluorosulfonyl) imide, bis(trifluoromethylsulfonyl) imide, tris(trifluoromethylsulfonyl) methyl, and perfluoroalkyl sulfonate.

Furthermore, the anion of the electrolyte solute is tetrafluoroborate.

Furthermore, the high-voltage supercapacitor is a supercapacitor having a charge cut-off voltage of 2.7 V to 3.2 V.

Another technical solution of the present invention is to provide an electrolyte, used for a high-voltage supercapacitor, including a solvent and a solute, and the solute contains the electrolyte solute according to any one of the items above.

Furthermore, in the electrolyte, the solvent is one of or a mixed solvent of two or more of nitriles, ethers, amides, esters and sulfones solvent.

Furthermore, the solvent in the electrolyte is one of or a mixed solvent of two or more of acetonitrile, propionitrile, butyronitrile, methoxypropionitrile, ethylene carbonate, dimethyl carbonate, propylene carbonate, γ-butyrolactone, γ-valerolactone, 1,3-propane sultone, 1,4-butane sultone, sulfolane, methyl ethyl sulfone, dimethyl sulfone, diethyl sulfone, dimethyl sulfoxide, diethyl sulfoxide, and tetramethylene sulfoxide.

Another technical solution of the present invention is to provide a high-voltage supercapacitor, including an electrolyte and an electricity core of two collector electrodes having activated carbon adhered thereon and a separator membrane disposed in the middle of the collector electrodes where the electrolyte is impregnated into the separator membrane, the electrolyte solute contains A, and A is one or more of substances having a chemical structural formula of the structural formula 1, the structural formula 2, and the structural formula 3, where R, $R_1$, $R_2$, $R_3$ and $R_4$ are respectively a hydrocarbyl group containing 1 to 5 carbon atoms, $^-$A is an anion, n and m are the number of substituents on the ring, n is an integer of 0 to 6, and m is an integer of 0 to 7.

In the solutions above, the concentration of A in the electrolyte is 0.05 to 2.0 mol/L, and preferably 0.5 to 1.5 mol/L.

Furthermore, the cation of A in the high-voltage supercapacitor is one or more of: N-methyl-1,4-diazabicyclo[2.2.2]octanediium, and N-methyl-1-azabicyclo[2.2.2]octanediium.

Furthermore, in the high-voltage supercapacitor, the anion is one or more of: tetrafluoroborate, hexafluorophosphate, bis(fluorosulfonyl) imide, bis(trifluoromethylsulfonyl) imide, tris(trifluoromethylsulfonyl) methyl, and perfluoroalkyl sulfonate.

Furthermore, in the high-voltage supercapacitor, the solvent is one of or a mixed solvent of two or more of acetonitrile, propionitrile, butyronitrile, methoxypropionitrile, ethylene carbonate, dimethyl carbonate, propylene carbonate, γ-butyrolactone, γ-valerolactone, 1,3-propane sultone, 1,4-butane sultone, sulfolane, methyl ethyl sulfone, dimethyl sulfone, diethyl sulfone, dimethyl sulfoxide, diethyl sulfoxide, and tetramethylene sulfoxide.

Furthermore, the charge cut-off voltage of the high-voltage supercapacitor is 2.7 V to 3.2 V.

Preferably, the charge cut-off voltage of the high-voltage supercapacitor is 2.7 to 3.0 V, the electrolyte solute is propyltrimethylammonium tetrafluoroborate, and the solvent is propylene carbonate.

Preferably, the charge cut-off voltage of the high-voltage supercapacitor is 2.8 to 3.2 V, the electrolyte solute is propyltrimethylammonium tetrafluoroborate, and the solvent is acetonitrile.

The present invention has the following beneficial effects: the high-voltage supercapacitor fabricated by using the electrolyte formulated by the electrolyte solute of the present invention can work stably for a long period of time at a voltage of 2.7 V to 3.2 V, the energy density is greatly increased, the property of high power density is maintained, and the working life of the high-voltage supercapacitor is greatly prolonged.

BRIEF DESCRIPTION OF THE DRAWINGS

No drawings.

DETAILED DESCRIPTION

In order to illustrate the technical contents, structural characteristics, the purpose and effects to be achieved of the present invention in detail, the present invention is described below in detail with embodiments.

The electrolyte solute in the present invention can be synthesized by using the following method: a corresponding organic amine (such as 1,4-diazabicyclo[2.2.2]octane) and dimethyl carbonate (DMC) at a certain molar ratio (DMC/1,4-diazabicyclo[2.2.2]octane=1.0 to 2.5) are reacted to generate a quaternary ammonium base; the quaternary ammonium base reacts with an acid (such as $HBF_4$) or an ammonium salt (such as $NH_4PF_6$) or an organic metal salt (such as $LiCF_3SO_3$) containing a corresponding anion to obtain a crude product; and the crude product is purified through recrystallization in a suitable solvent, to obtain a capacitor grade high-purity solute salt.

A supercapacitor model is assembled in a glove box: An electricity core including two collector electrodes fabricated by using aluminum foil, two working electrodes fabricated by using activated carbon, and a fiber membrane inserted between the electrodes is wound into a core package, but not limited to this structure. The electricity core is immersed in an electrolyte in the following comparative examples and embodiments, and is assembled and sealed by using an aluminum case and particles.

A supercapacitor testing process includes:

(1) precycling (10 times): charging at 25° C., a charge cut-off voltage of U, and a constant current of 10 mA/F; and discharging at a lower limit voltage of U/2 and a constant current of 10 mA/F;

(2) in a high-temperature test chamber of 65° C., charging at a constant current of 10 mA/F to an upper limit voltage of U, and maintaining at this voltage (U) for a certain period of time;

(3) taking out the supercapacitor and cooling to 25° C., then subjecting the supercapacitor to charge-discharge test under the same test condition as that in precycling, and calculating the capacity retention ratio and rate of increase of ESR of the supercapacitor; and (4) taking the capacity retention ratio of less than or equal to 60%, and/or the rate of increase of ESR of greater than or equal to 100% as the judgment standards for the service life of the supercapacitor.

Embodiment 1

An electrolyte of 1.0 mol/L was formulated by using N-methyl-1,4-diazabicyclo[2.2.2]octanediium tetrafluoroborate ($MDACOBF_4$) as the solute and AN as the solvent, and the conductivity at 25° C. was determined. The solute, the solvent, and the concentration of the electrolyte were adjusted as specifically described in the following embodiments and comparative examples, and the results of conductivity were listed in Table 1. The supercapacitor was fabricated by using the electrolyte of this embodiment and was tested for the electrochemical performance, and the test results of service life were listed in Table 2.

Embodiments 2 to 12

The conditions were the same as those in Embodiment 1, the solute, the solvent, and the concentration of the electrolyte were adjusted, and the detailed data was shown in Tables 2 to 5. The chemical structural formulas of the solutes were as follows:

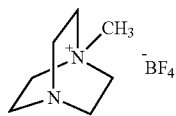

MDABCOBF$_4$

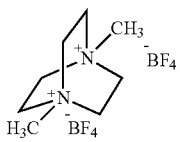

DMDABCO(BF$_4$)$_2$

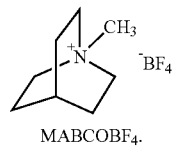

MABCOBF$_4$.

The supercapacitors were fabricated by using the electrolytes of these embodiments, and were tested for the electrochemical performance, and the test results of service life were listed in Tables 2 to 5.

Comparative Example 1

An electrolyte of 1.0 mol/L was formulated by using tetraethyl ammonium tetrafluoroborate as the solute and AN as the solvent, the conductivity at 25° C. was determined, and the results were listed in Table 1. The supercapacitor fabricated by using the electrolyte of this embodiment was tested for the electrochemical performance, and the test results of service life were listed in Table 2.

Comparative Examples 2 to 5

The conditions were the same as those in Comparative example 1, the solute, the solvent, and the concentration of the electrolyte were adjusted, and the detailed data was shown in Tables 2 to 5. The supercapacitors were fabricated by using the electrolytes of these embodiments, and were tested for the electrochemical performance, and the test results of service life were listed in Tables 2 to 5.

TABLE 1

Conductivity of the electrolytes at 25° C.

| electrolyte | Embodiment 1 | Embodiment 2 | Embodiment 3 | Embodiment 4 | Embodiment 5 | Embodiment 6 |
|---|---|---|---|---|---|---|
| conductivity/mS/cm | 43.4 | 45.2 | 44.6 | 46.3 | 11.9 | 11.8 |
| electrolyte | Embodiment 7 | Embodiment 8 | Embodiment 9 | Embodiment 10 | Embodiment 11 | Embodiment 12 |
| conductivity/mS/cm | 11.7 | 45.8 | 44.7 | 44.1 | 46.2 | 27.3 |
| electrolyte | Comparative example 1 | Comparative example 2 | Comparative example 3 | Comparative example 4 | | |
| conductivity/mS/cm | 54.6 | 50.7 | 46.9 | 13.2 | | |

TABLE 2

Data of service life of the capacitors

| | | | service life/h | | |
|---|---|---|---|---|---|
| | solute | solvent | 2.8 V | 3.0 V | 3.2 V |
| Embodiment 1 | MDABCOBF$_4$: 1 mol/L | acetonitrile | 4400 | 2650 | 750 |
| Embodiment 2 | MABCOBF$_4$: 1 mol/L | acetonitrile | 4500 | 2700 | 780 |
| Embodiment 3 | MDABCOBF$_4$: 0.9 mol/L; DMDABCO(BF$_4$)$_2$: 0.1 mol/L | acetonitrile | 4180 | 2400 | 680 |
| Embodiment 4 | MDABCOBF$_4$: 0.9 mol/L; tetraethyl ammonium tetrafluoroborate: 0.1 mol/L | acetonitrile | 3600 | 1880 | 500 |
| Comparative example 1 | tetraethyl ammonium tetrafluoroborate: 1 mol/L | acetonitrile | 1500 | 820 | 240 |
| Comparative example 2 | N,N-dimethyl ammonium tetrafluoroborate pyrrolidine: 1 mol/L | acetonitrile | 3100 | 1600 | 420 |
| Comparative example 3 | propyltrimethylammonium tetrafluoroborate: 1 mol/L | acetonitrile | 3800 | 1970 | 530 |

TABLE 3

Data of service life of the capacitors

| | solute | solvent | service life/h 2.7 V | 2.8 V | 3.0 V |
|---|---|---|---|---|---|
| Embodiment 5 | MABCOBF$_4$: 1 mol/L | propylene carbonate | 2700 | 1500 | 450 |
| Embodiment 6 | MABCOBF$_4$: 0.9 mol/L MDABCOBF$_4$: 0.1 mol/L | propylene carbonate | 2300 | 1200 | 300 |
| Embodiment 7 | MABCOBF$_4$: 0.9 mol/L DMDABCOBF$_4$: 0.1 mol/L | propylene carbonate | 2550 | 1400 | 400 |
| Comparative example 4 | methyltriethylammonium tetrafluoroborate: 1 mol/L | propylene carbonate | 1400 | 750 | 210 |

TABLE 4

Data of service life of the capacitors

| | solute | solvent | service life/h 2.8 V | 3.0 V | 3.2 V |
|---|---|---|---|---|---|
| Embodiment 1 | MDABCOBF$_4$: 1 mol/L | acetonitrile | 4400 | 2650 | 750 |
| Embodiment 8 | MDABCOPF$_6$: 1 mol/L | acetonitrile | 2100 | 1300 | 350 |
| Embodiment 9 | MDABCOC(CF$_3$SO$_2$)$_2$: 1 mol/L | acetonitrile | 2250 | 1400 | 370 |
| Embodiment 10 | MDABCON(CF$_3$SO$_2$)$_2$: 1 mol/L | acetonitrile | 2200 | 1350 | 360 |

TABLE 5

Data of service life of the capacitors

| | solute | solvent | service life/h 2.8 V | 3.0 V | 3.2 V |
|---|---|---|---|---|---|
| Embodiment 11 | MDABCOBF$_4$: 1.5 mol/L | acetonitrile | 3400 | 1970 | 560 |
| Comparative example 5 | N,N-dimethyl ammonium tetrafluoroborate pyrrolidine: 1.5 mol/L | acetonitrile | 2200 | 1100 | 300 |
| Embodiment 12 | MDABCOBF$_4$: 0.5 mol/L | acetonitrile | 4020 | 2480 | 670 |
| Comparative example 6 | N,N-dimethyl ammonium tetrafluoroborate pyrrolidine: 0.5 mol/L | acetonitrile | 2960 | 1480 | 400 |

It can be clearly seen from data in Tables 2 to 5 that, in different solvent systems, at different cut-off voltages, for the supercapacitor fabricated by using the high-voltage solute of the present invention, the service life is significantly prolonged, and the electrochemical performance is significantly improved. It can be seen from the comparative examples that, for the supercapacitor fabricated by using the electrolyte prepared by using the conventional solute, at a high voltage (2.7 V and more), the service life of the capacitor is greatly shortened, and with an increase in the cut-off voltage, the service life of the capacitor attenuates severely.

The embodiments described above are merely embodiments of the present invention, but the patent scope of the present invention is not limited thereto. Any equivalent structure or equivalent process transformation made by using the specification of the present invention directly or indirectly applied in other relevant technical fields shall fall within the protection scope of the present invention.

The invention claimed is:

1. An electrolyte, used for a high-voltage supercapacitor, comprising a solvent and a solute, wherein the solute comprises A, the A is one or more of substances having a chemical structural formula of a structural formula 1, and a structural formula 3 below:

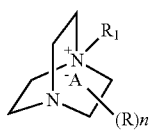

Structural formula 1

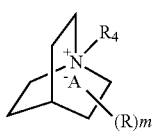

Structural formula 3 wherein R, R$_1$, and R$_4$ are respectively a hydrocarbyl group containing 1 to 5 carbon atoms, $^-$A is an anion, n and m are the number of substituents on the ring, n is an integer of 0 to 6, and m is an integer of 0 to 7.

2. The electrolyte according to claim 1, wherein the solvent is one of or a mixed solvent of two or more of nitriles, ethers, amides, esters and sulfones solvent.

3. The electrolyte according to claim 2, wherein the solvent is one of or a mixed solvent of two of acetonitrile, propionitrile, butyronitrile, methoxypropionitrile, ethylene carbonate, dimethyl carbonate, propylene carbonate, γ-butyrolactone, γ-valerolactone, 1,3-propane sultone, 1,4-butane sultone, sulfolane, methyl ethyl sulfone, dimethyl sulfone, diethyl sulfone, dimethyl sulfoxide, diethyl sulfoxide and tetramethylene sulfoxide.

4. The electrolyte according to claim 1, wherein the cation of A is one or more of: N-methyl-1,4-diazabicyclo[2.2.2]octanediium, N,N-dimethyl-1,4-diazabicyclo[2.2.2]octanediium, and N-methyl-1-azabicyclo[2.2.2]octanediium.

5. The electrolyte according to claim 1, wherein the anion is one or more of: tetrafluoroborate, hexafluorophosphate, bis(fluorosulfonyl)imide, bis(trifluoromethylsulfonyl)imide, tris(trifluoromethylsulfonyl)methyl, and perfluoroalkyl sulfonate.

6. A high-voltage supercapacitor, comprising an electrolyte and an electricity core of two collector electrodes having activated carbon adhered thereon and a separator membrane disposed in the middle of the collector electrodes where the electrolyte is impregnated into the separator membrane, the electrolyte solute comprises A, the A is one or more of substances having a chemical structural formula of the structural formula 1, and the structural formula 3,

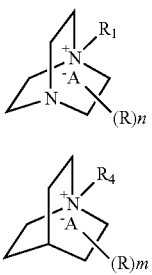

Structural formula 1

Structural formula 3 wherein R, $R_1$, and $R_4$ are respectively a hydrocarbyl group containing 1 to 5 carbon atoms, $^-A$ is an anion, n and m are the number of substituents on the ring, n is an integer of 0 to 6, and m is an integer of 0 to 7.

7. The high-voltage supercapacitor according to claim 6, wherein the cation of A is one or more of:
N-methyl-1,4-diazabicyclo[2.2.2]octanediium, and N-methyl-1-azabicyclo[2.2.2]octanediium.

8. The high-voltage supercapacitor according to claim 6, wherein the anion is one or more of: tetrafluoroborate, hexafluorophosphate, bis(fluorosulfonyl) imide, bis(trifluoromethylsulfonyl) imide, tris(trifluoromethylsulfonyl) methyl, and perfluoroalkyl sulfonate.

9. The high-voltage supercapacitor according to claim 6, wherein the solvent is one of or a mixed solvent of two of acetonitrile, propionitrile, butyronitrile, methoxypropionitrile, ethylene carbonate, dimethyl carbonate, propylene carbonate, γ-butyrolactone, γ-valerolactone, 1,3-propane sultone, 1,4-butane sultone, sulfolane, methyl ethyl sulfone, dimethyl sulfone, diethyl sulfone, dimethyl sulfoxide, diethyl sulfoxide, and tetramethylene sulfoxide.

10. The high-voltage supercapacitor according to claim 6, wherein the charge cut-off voltage is 2.7 V to 3.2 V.

11. The high-voltage supercapacitor according to claim 6, wherein the charge cut-off voltage is 2.7 to 3.0 V, the electrolyte solute is N-methyl-1-azabicyclo[2.2.2]octanediium tetrafluoroborate, and the solvent is propylene carbonate.

12. The high-voltage supercapacitor according to claim 6, wherein the charge cut-off voltage is 2.8 to 3.2 V, the electrolyte solute is N-methyl-1,4-diazabicyclo[2.2.2]octanediium tetrafluoroborate, and the solvent is acetonitrile.

13. The high-voltage supercapacitor according to any one of claim 6, wherein the concentration of A in the electrolyte is 0.5 to 1.5 mol/L.

* * * * *